United States Patent
Yoo (10) Patent No.: US 8,244,756 B2
(45) Date of Patent: Aug. 14, 2012

(54) METHOD AND DEVICE FOR SEARCHING FOR MUSIC FILE OF MOBILE TERMINAL

(75) Inventor: Jung Jin Yoo, Gyeongsan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 401 days.

(21) Appl. No.: 12/605,667

(22) Filed: Oct. 26, 2009

(65) Prior Publication Data

US 2010/0106741 A1    Apr. 29, 2010

(30) Foreign Application Priority Data

Oct. 29, 2008    (KR) .................. 10-2008-0106262

(51) Int. Cl.
*G06F 7/00* (2006.01)
(52) U.S. Cl. ......... 707/770; 707/706; 707/769; 707/709
(58) Field of Classification Search .................. 707/770, 707/769, 706, 709
See application file for complete search history.

(56) References Cited

U.S. PATENT DOCUMENTS

| | | | |
|---|---|---|---|
| 2005/0079863 A1* | 4/2005 | Macaluso | 455/419 |
| 2006/0136389 A1* | 6/2006 | Cover et al. | 707/3 |
| 2007/0052868 A1* | 3/2007 | Chou et al. | 348/734 |
| 2008/0070622 A1* | 3/2008 | Lee | 455/556.1 |
| 2010/0017741 A1* | 1/2010 | Karp et al. | 715/780 |

* cited by examiner

*Primary Examiner* — Etienne LeRoux
*Assistant Examiner* — Cindy Nguyen
(74) *Attorney, Agent, or Firm* — Jefferson IP Law, LLP (57) ABSTRACT

A method and device for searching for a music file of a mobile terminal are provided. The method of searching for a music file of a mobile terminal includes, receiving at least one input key signal in an idle state of the mobile terminal, setting a search word by combining characters mapped to the received at least one input key signal, determining whether a music file that includes the search word exists within the mobile terminal, and requesting, if it is determined that a music file that includes the search word does not exist within the mobile terminal, a search for a music file that includes the search word to a preset web server.

15 Claims, 5 Drawing Sheets

METHOD AND DEVICE FOR SEARCHING FOR MUSIC FILE OF MOBILE TERMINAL

PRIORITY

This application claims the benefit under 35 U.S.C. §119(a) of a Korean patent application filed on Oct. 29, 2008 in the Korean Intellectual Property Office and assigned Serial No. 10-2008-0106262, the entire disclosure of which is hereby incorporated by reference.

BACKGROUND OF THE INVENTION

1. Field of the Invention

The present invention relates to a method and device for controlling a mobile terminal. More particularly, the present invention relates to a method and device for searching for a music file of a mobile terminal.

2. Description of the Related Art

In general, as various functions are added to a mobile terminal, the operation of the mobile terminal becomes increasingly complex. Nowadays, mobile terminals provide various functions such as message transmission and reception, wireless Internet, phonebook management, schedule management, photographing, audiovisual communication, recording, and music file reproduction in addition to a communication function. Such a mobile terminal can store many music files due to a large capacity of a storage unit. For example, the mobile terminal may be capable of storing several thousand music files.

The mobile terminal stores the large quantity of music files on a multi-step basis using a folder. Therefore, in order to search for and reproduce a specific music file, a user must perform multiple steps, such as execution of a music reproduction menu, from among the several menus of the mobile terminal, and selection of the desired music file. Accordingly, a method for more quickly and efficiently searching for and reproducing a music file is needed.

SUMMARY OF THE INVENTION

An aspect of the present invention is to address the above-mentioned problems and/or disadvantages and to provide at least the advantages described below. Accordingly, an aspect of the present invention is to provide a method and device of searching for a music file of a mobile terminal that can search for a music file in an idle state of the mobile terminal and reproduce the found music file.

In accordance with an aspect of the present invention, a method of searching for a music file of a mobile terminal is provided. The method includes, receiving at least one input key signal in an idle state of the mobile terminal, setting a search word by combining characters mapped to the received at least one input key signal, determining whether a music file that includes the search word exists within the mobile terminal, and requesting, if it is determined that a music file that includes the search word does not exist within the mobile terminal, a search for a music file that includes the search word to a preset web server.

In accordance with another aspect of the present invention, a device for searching for a music file of a mobile terminal is provided. The device includes, a storage unit for storing a music file, a conversion unit for combining characters mapped to at least one input key signal in an idle state of the mobile terminal and converting the combined characters to a search word for searching for a music file, a search unit for searching for a music file that includes the search word in the storage unit; a controller for requesting, if a music file that includes the search word does not exist in the storage unit, a search for a music file that includes the search word to a preset web server, and a Radio Frequency (RF) unit for transmitting a music file search request signal to the web server.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

While the present invention may be embodied in many different forms, specific exemplary embodiments of the present invention are shown in the drawings and are described herein with the understanding that the present disclosure is to be considered merely as an exemplification of the principles of the invention and is not intended to limit the invention to the specific exemplary embodiments illustrated.

In the following description, for convenience of description, a mobile terminal according to an exemplary embodiment of the present invention is described as a mobile communication terminal. However the present invention is not limited thereto. The mobile terminal according to the present exemplary embodiment includes any terminal that can store, reproduce, and search for a music file and may be any information and communication device or a multimedia device, such as a mobile phone, a Personal Digital Assistant (PDA), a smart phone, an International Mobile Telecommunication 2000 (IMT-2000) terminal, a Code Division Multiple Access (CDMA) terminal, a Wideband Code Division Multiple Access (WCDMA) terminal, a Global System for Mobile Communication (GSM) terminal, a General Packet Radio Service (GPRS) terminal, a Universal Mobile Telecommunication Service (UMTS) terminal, a Portable Multimedia Player (PMP), a digital broadcasting terminal, and applications thereof.

Figure 1:
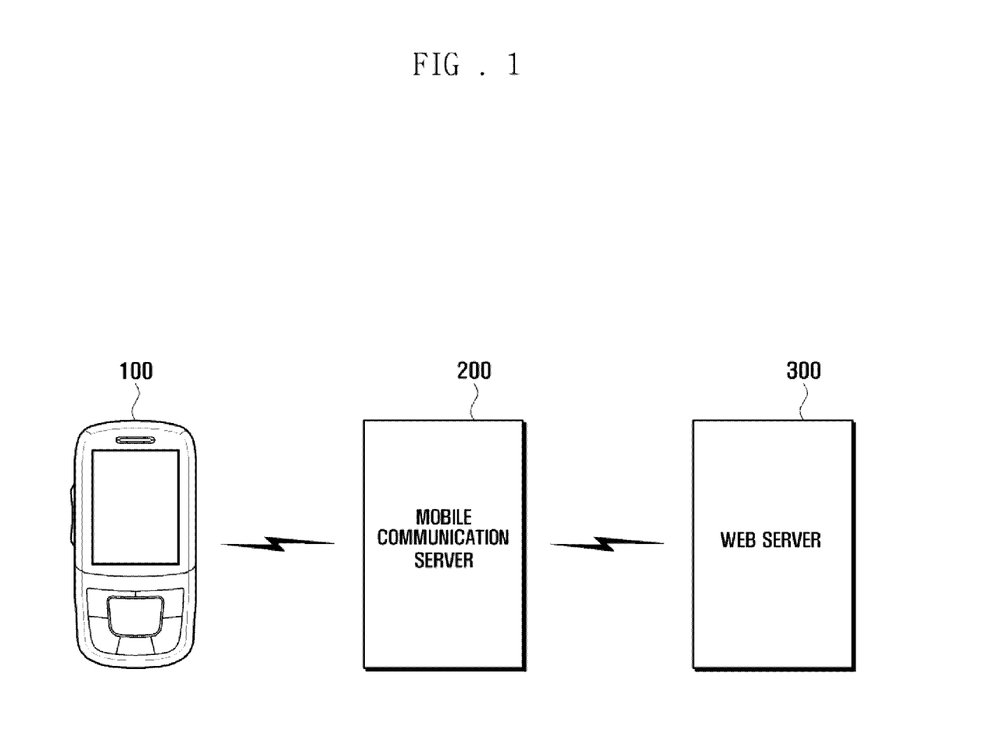
FIG. 1 is a diagram illustrating a music file search system according to an exemplary embodiment of the present invention.

FIG. 1 is a diagram illustrating a music file search system according to an exemplary embodiment of the present invention.

Referring to FIG. 1, a music file search system includes a mobile terminal 100, mobile communication server 200, and web server 300.

When a user inputs one or more keys in an idle state of the mobile terminal 100, the mobile terminal 100 converts characters mapped to the one or more input keys to a search word. Thereafter, the mobile terminal 100 searches for a music file that includes the search word in a storage unit and displays the found music file. If a music file that includes the search word does not exist in the storage unit, the mobile terminal 100 connects to the web server 300 through the mobile communication server 200 and requests the web server 300 to search for a music file that includes the search word. The web server 300 includes a music site provided by a web service provider. The mobile terminal 100 includes a Radio Frequency (RF) unit for performing wireless communication with the mobile communication server 200. Further, the mobile terminal 100 stores an address of the web server 300. The address of the web server 300 is stored by a provider of the mobile terminal 100, or is stored by a user's selection.

The mobile communication server 200 is a device for providing a mobile communication service. The mobile communication server 200 enables the mobile terminal 100 to connect to the web server 300. When a communication service provider provides a music service, the mobile communication server 200 may perform a function of the web server 300.

The web server 300 is a device for providing a web service. More particularly, the web server 300 searches for a music file according to a request of the mobile terminal 100. Specifically, the web server 300 receives a search word input by a user in an idle state of the mobile terminal 100 from the mobile terminal 100, searches for a music file that includes the search word, and transmits the search result to the mobile terminal 100.

In an exemplary embodiment, the mobile terminal 100 is connected to the web server 300 through the mobile communication server 200. However, the present invention is not limited thereto. The mobile terminal 100 may be directly connected to the web server 300 using a short range wireless communication system such as Wireless broadband (Wibro), wireless Local Area Network (LAN), and WIreless FIdelity (WiFi) without using the mobile communication server 200.

A configuration of a mobile terminal according to an exemplary embodiment of the present invention is described hereinafter.

Figure 2:
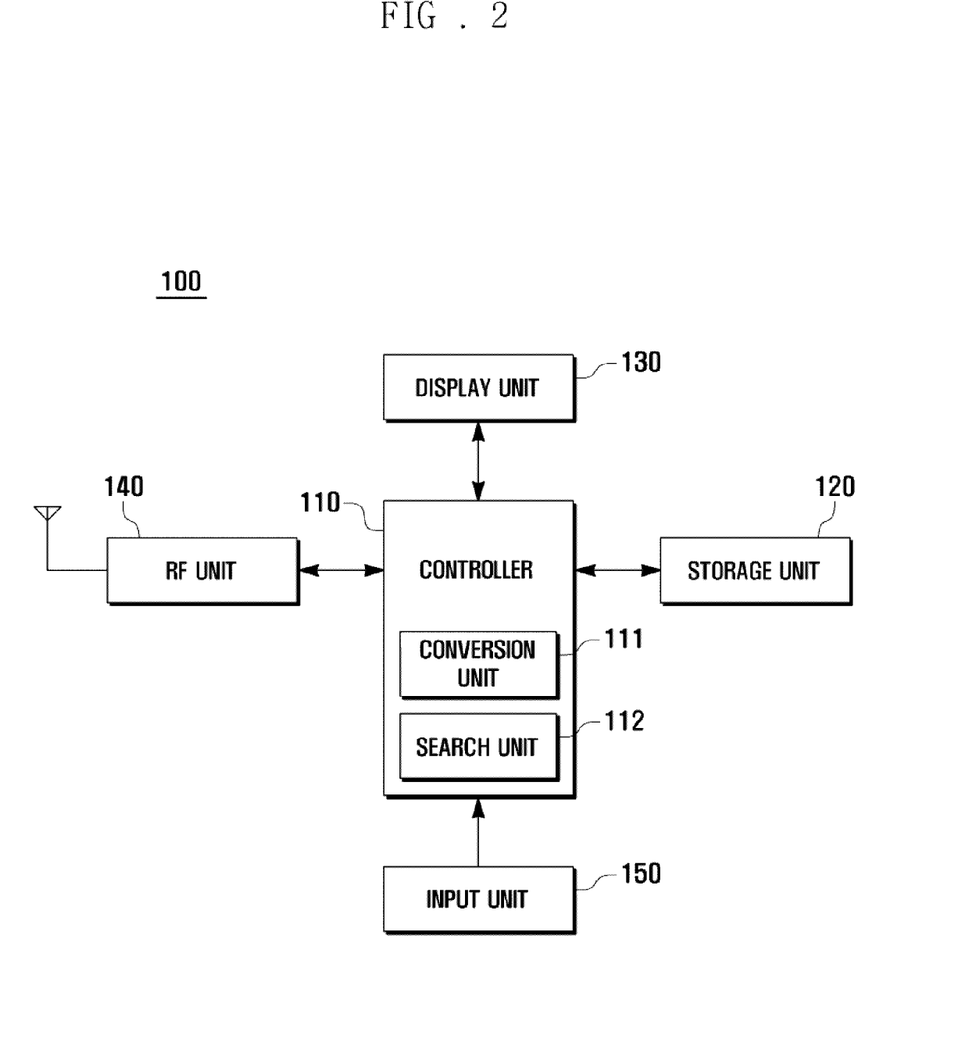
FIG. 2 is a block diagram illustrating a configuration of a mobile terminal according to an exemplary embodiment of the present invention.

FIG. 2 is a block diagram illustrating a configuration of a mobile terminal according to an exemplary embodiment of the present invention.

Referring to FIG. 2, the mobile terminal 100 includes a controller 110, a storage unit 120, a display unit 130, a Radio Frequency (RF) unit 140, and an input unit 150. The controller 110 includes a search unit 112 and a conversion unit 111

The input unit 150 is used for inputting numeral or character information and includes a plurality of input keys and function keys for setting various functions. The function keys may include a direction key, a side key, a hotkey set to perform a specific function, and the like. More particularly, the input unit 150 may include a hotkey to execute a function for enabling a user to input one or more keys and to search for a music file in an idle state of the mobile terminal 100. The hotkey can be set as, for example, an MP3 key for performing a music reproduction function.

The RF unit 140 provides a mobile communication service such as data communication and voice communication with another mobile terminal and forms a communication channel with a base station. For this, the RF unit 140 includes an RF transmitter for up-converting a frequency of a signal to be transmitted and amplifying the signal, and an RF receiver for low-noise amplifying a received signal and down-converting a frequency of the signal. More particularly, the RF unit 140 transmits a music file search request signal to the web server 300 by the control of the controller 110. Further, the RF unit 140 receives a response from the web server 300 to a music file search request from the RF unit 140 including a result of a music file search by the web server 300. That is, the RF unit 140 receives a list of music files that include a search word. The RF unit 140 may download a music file from the web server 300 according to a user's selection.

The display unit 130 displays user data input by a user, function setting information, and various information provided to the user as well as various menu screens of the mobile terminal 100. The display unit 130 may be one of a Liquid Crystal Display (LCD) and an Organic Light Emitting Diode (OLED) display. Further, when the display unit 130 is formed as a touch screen, the display unit 130 can be operated as an input means. More particularly, the display unit 130 displays a character mapped to a key input by the user in an idle state of the mobile terminal 100 on a display screen. The character is generally a numeral.

The display unit 130 displays a list of music files that are found in the storage unit 120 or the web server 300 by combining characters mapped to one or more keys input in an idle state of the mobile terminal 100 by the control of the controller 110. In a case where the display unit 130 is set to determine a character mapped to an input key and to display a corresponding phonebook search result, when a key is input in an idle state of the mobile terminal 100, a phonebook search result corresponding to the input key is displayed. If a specific hotkey, for example an MP3 key for requesting a search of a music file, is then input, the controller 110 searches for a music file that includes a search word matched to the input keys and controls the display unit 130 to display a list of found files.

Further, if a music file that includes the search word does not exist within the storage unit 120, the display unit 130 displays a pop-up window inquiring whether the user wants the mobile terminal 100 to connect to the web server 300. If the user selects to connect the mobile terminal 100 to the web server 300, the display unit 130 displays a music file list received from the web server 300. Further, in order to notify the user which web server 300 is searching for a music file, the display unit 130 displays an address of the web server 300 together with the music file list. In a case where the mobile terminal 100 is set to automatically connect to the web server 300, the display unit 130 may not display a pop-up window notifying that the mobile terminal 100 is connected to the web server 300.

Further, when a plurality of search words exist corresponding to key input, the display unit 130 displays the search words and enables the user to select a desired search word. A more detailed description thereof is described later in relation to the controller 110.

The storage unit 120 stores user data as well as a program necessary for operating a function according to the present exemplary embodiment. The storage unit 120 includes a program area and a data area.

The program area stores a program for controlling general operations of the mobile terminal 100, an operating system for booting the mobile terminal 100, an application program necessary for reproducing a multimedia content, and an application program necessary for option functions, for example a photographing function, sound reproduction function, image or moving picture reproduction function, and music file search function of the mobile terminal 100. More particularly, the program area includes a program for converting one or more key inputs to a search word, a search program, and a web connection program for connecting to the web server 300.

The data area is an area for storing data generated by using the mobile terminal 100 and stores a phonebook, audio data, contents corresponding thereto, and information corresponding to user data. More particularly, the data area stores an address of the web server 300. The address of the web server 300 may be a basic address input and stored by a provider of the mobile terminal 100, or an address input and stored by a user. In an exemplary embodiment, if a music file requested by the user does not exist within the mobile terminal 100, the controller 110 requests a search for a music file by connecting to the web server 300 using the address of the web server 300.

The controller 110 controls general operations of the mobile terminal 100 and signal flows between units of the mobile terminal 100, and performs a data processing function. More particularly, the controller 110 includes the conversion unit 111 and the search unit 112.

If one or more keys are input in an idle state of the mobile terminal 100, the conversion unit 111 converts the input keys to a search word. In this case, if an input key has a plurality of characters mapped thereto, the controller 110 controls the display unit 130 to display the plurality of characters mapped to the input key and enables the user to select at least one of the plurality of characters. For example, if characters "j, k, l" are mapped to the number '5' key, if the number '5' key is input, the controller 110 controls to display the characters "j, k, l" at one side of the display unit 130, and enables the user to select at least one of the characters "j, k, l". As each subsequent key is input, the process is repeated. Further, when a plurality of keys are input in an idle state of the mobile terminal 100, the conversion unit 111 can combine and display characters mapped to the plurality of input keys as a plurality of combined words, enabling the user to select one of the plurality of combined words. In this case, before displaying a combined word, it is preferable that the conversion unit 111 determines whether the combined word is registered in a dictionary, and displays only a registered word. Alternatively, the conversion unit 111 may have a word completion function of determining a previous search record and displaying a previous word similar to a character input by the user. A word combined in the conversion unit 111 and selected by the user is used as a search word for searching for a music file.

The search unit 112 determines whether a music file that includes the search word exists within the storage unit 120. In this case, if a specific hotkey, for example an MP3 key for requesting a search of a music file, is input, the search unit 112 searches for a music file that includes the search word. The search unit 112 searches for a music file by determining an extension of a file stored in the storage unit 120. For example, when an extension of a file is one of MP3, ogg, wav, wma, and mid, the controller 110 determines that the file is a music file. When the search unit 112 searches for a music file, the search unit 112 determines whether the search word is included in attribute information of a music file, such as a file name, album name, singer name and the like. If a music file in which the search word is included in attribute information does not exist in the storage unit 120, the search unit 112 notifies the controller 110 thereof.

When the controller 110 receives, from the search unit 112, a signal that a music file that includes the search word does not exist in the storage unit 120, the controller 110 controls to display, in the display unit 130, a pop-up window inquiring whether the user wants the mobile terminal 100 to connect to the web server 300. Alternatively, in a case where the mobile terminal 100 is set to automatically connect to the web server 300, the controller 110 requests a search of a music file that includes the search word by automatically connecting to a preset web server 300. Thereafter, the controller 110 receives a search result through the RF unit 140. Further, when the user selects to reproduce a found music file, the controller 110 downloads and reproduces the selected music file from the web server 300.

The controller 110 combines characters mapped to one or more input keys in an idle state of the mobile terminal 100, searches for the combined characters in a phonebook and controls to display the search result, and when a specific hotkey is input, for example an MP3 key for requesting a search of a music file, searches for a music file. Alternatively, if one or more keys are input in an idle state of the mobile terminal 100, the controller 110 searches for one of phonebook data or a music file according to a user selection. For this, if a key is input in an idle state of the mobile terminal 100, the mobile terminal 100 displays a menu for selecting a search of a phonebook data or a music file.

Further, although not shown in the drawings, the mobile terminal 100 may selectively include further constituent elements having an additional function, such as a camera module for photographing an image or a moving picture, broadcasting reception module for receiving digital broadcasting, and a short range wireless communication module such as a Bluetooth communication module.

Hereinafter, for convenience of description, an example of a mobile terminal in which English text characters are mapped to keys is described.

Figure 3:
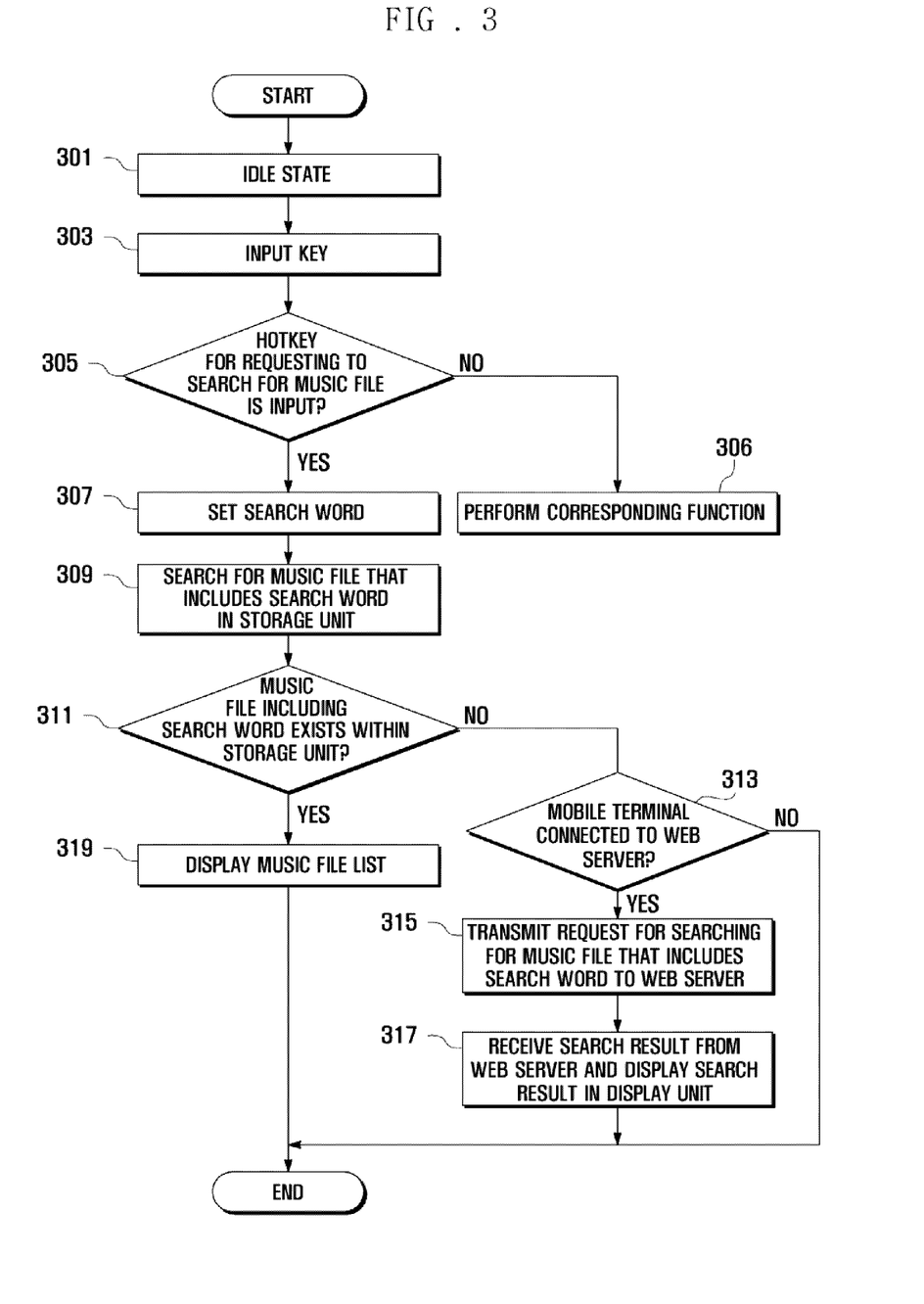
FIG. 3 is a flowchart illustrating a method of searching for a music file of a mobile terminal according to an exemplary embodiment of the present invention.

FIG. 3 is a flowchart illustrating a method of searching for a music file of a mobile terminal according to an exemplary embodiment of the present invention. FIGS. 4A to 4D are display screen examples illustrating steps of a method of searching for a music file according to an exemplary embodiment of the present invention.

Referring to FIG. 3 and FIGS. 4A to 4D, when the mobile terminal 100 is turned on, the mobile terminal 100 is in an idle state in step 301. The user inputs one or more keys in the mobile terminal 100 in step 303.

The controller 110 determines whether a hotkey for requesting to search for a music file is input in step 305. If it is determined that a hotkey for requesting to search for a music file is not input, the controller 110 performs a corresponding function in step 306. For example, the controller 110 may control the display unit 130 to display a phonebook data search result according to the key input at step 303. In this case, if a communication key is subsequently input, the controller 110 requests communication to an input phone number.

Figure 4A:
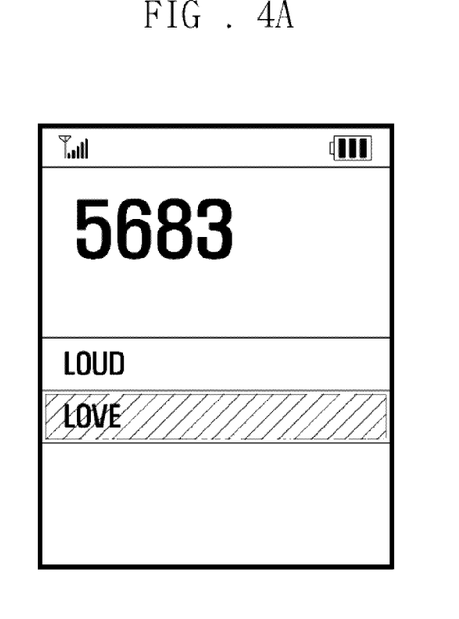
FIGS. 4A to 4D are display screen examples illustrating steps of a method of searching for a music file according to an exemplary embodiment of the present invention.

If it is determined that a hotkey key for requesting to search for a music file is input at step 305, the controller 110 combines characters mapped to the keys input at step 303 and sets a search word in step 307. In this case, when a plurality of characters are mapped to a single key, the controller 110 controls to display words formed by combining the plurality of characters mapped to the input keys with reference to a previously stored dictionary, so that the user may select a search word. For example, as shown in FIG. 4A, if "5683" is input, the controller 110 controls to display the words "LOUD" and "LOVE" found in the stored dictionary, and the user selects one of the displayed words to set the search word.

In accordance with an exemplary embodiment, step 305 may be omitted. That is, when one or more keys are input in an idle state of the mobile terminal 100 at step 303, the controller 110 may combine characters mapped to the input keys and set a search word.

When the search word is set, the controller 110 searches for a music file that includes the search word in the storage unit 120 to determine whether such a music file exists therein in step 309. The controller 110 searches for a music file that includes the search word within the storage unit 120 by determining attribute information stored in the storage unit 120. The attribute information may include a file name, an album name, and a singer name.

Figure 4B:
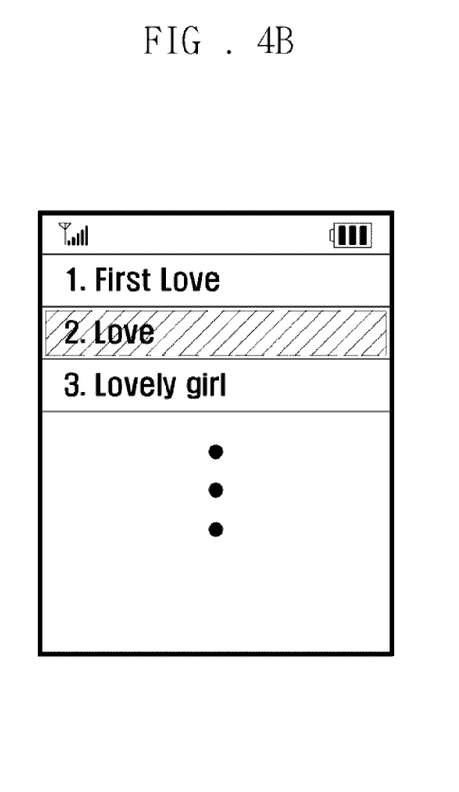
Figure 4C:
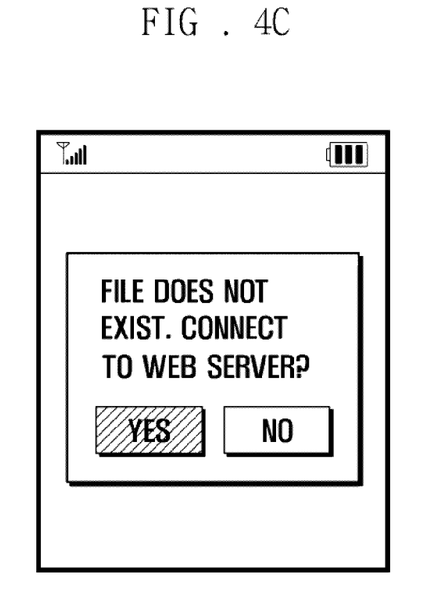

The controller 110 determines whether a music file that includes the search word exists within the storage unit 120 in step 311. If it is determined that a music file that includes the search word exists within the storage unit 120, the controller 110 controls to display a list of found music files in step 319, as shown in FIG. 4B. If it is determined that a music file that includes the search word does not exist within the storage unit 120 at step 311, the controller 110 determines whether the mobile terminal 100 is connected to the web server 300 in step 313. Here, the controller 110 may also control the display unit 130 to display a pop-up window inquiring whether the user wants the mobile terminal 100 to connect to the web server 300, as shown in FIG. 4C.

If it is determined that the mobile terminal 100 is not connected to the web server 300 in step 313, the controller 110 terminates the search process according to the exemplary embodiment. Alternatively, if it is determined that the mobile terminal 100 is connected to the web server 300, the controller 110 transmits a request for searching for a music file that includes the search word to the web server 300 in step 315. For this, the mobile terminal 100 stores an address of the web server 300. The address of the web server 300 can be stored by a provider of the mobile terminal 100, or can be stored by the user.

Figure 4D:
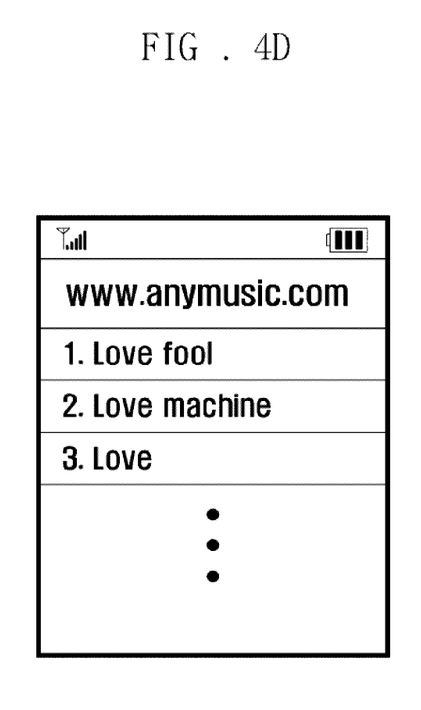

The controller 110 receives a search result from the web server 300 and controls to display the search result in the display unit 130 in step 317. If a music file that includes the search word exists in the web server 300, the controller 110 controls to display a list of found music files, as shown in FIG. 4D. In this case, the music file list received from the web server 300 is displayed with the address of the web server 300. If a music file that includes the search word does not exist within the web server 300, the controller 110 controls to display a pop-up window notifying the user that no music file exists.

Although not shown in FIG. 3, a method of searching for a music file according to an exemplary embodiment may further include a process of selecting a file to be reproduced from the music file list and reproducing the selected file. Further, the method may include a process of downloading a music file found in the web server 300, and may include, if a music file that includes the search word does not exist in the web server 300, a process of receiving an address of another web server.

Further, when one or more keys are input in an idle state of the mobile terminal 100, the controller 110 searches for one of a phonebook data or a music file according to a user selection. For this, the mobile terminal 100 according to an exemplary embodiment includes a menu for selecting whether to search for a phonebook data or a music file when a key is input in an idle state.

As described above, exemplary embodiments of the present invention enable quick searching for a music file by directly inputting a search word in an idle state. Accordingly, exemplary embodiments of the present invention can quickly reproduce music without requiring multiple steps to be performed. Further, when a desired music file does not exist in a mobile terminal, the present invention can search for and download a music file by connecting to a preset web server, thereby providing user convenience.

Certain aspects of the present invention can also be embodied as computer readable code on a computer readable recording medium. A computer readable recording medium is any data storage device that can store data which can be thereafter read by a computer system. Examples of the computer readable recording medium include Read-Only Memory (ROM), Random-Access Memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, code, and code segments for accomplishing the present invention can be easily construed by programmers skilled in the art to which the present invention pertains.

While the invention has been shown and described with reference to certain exemplary embodiments thereof, it will be understood by those skilled in the art that various changes in form and details may be made therein without departing from the spirit and scope of the invention as defined in the appended claims and their equivalents.

What is claimed is:

1. A method of searching for a music file of a mobile terminal, the method comprising:

receiving at least one input key signal in an idle state of the mobile terminal;

determining whether a hotkey for requesting to search for a music file is input;

displaying, if the hotkey for requesting to search for a music file is not input, a phonebook data search result according to the at least one input key signal;

setting, if the hotkey for requesting to search for a music file is input, a search word by combining characters mapped to the received at least one input key signal;

determining whether a music file that includes the search word exists within a storage unit of the mobile terminal; and requesting, if it is determined that a music file that includes the search word does not exist within the storage unit of the mobile terminal, a search for a music file that includes the search word to a preset web server.

2. The method of claim 1, further comprising:
displaying, if a music file that includes the search word exists within one of the mobile terminal and the preset web server, a list of the found music files.

3. The method of claim 1, further comprising:
determining, before requesting a search for a music file that includes the search word to the preset web server, whether the mobile terminal is connected to the preset web server.

4. The method of claim 1, further comprising:
setting and storing, before requesting a search for a music file that includes the search word to the preset web server, an address of the preset web server.

5. The method of claim 1, wherein the requesting of the search for the music file that includes the search word to the preset web server comprises determining whether the search word is included in attribute information including at least one of a music file name, an album name, and a singer name.

6. The method of claim 1, further comprising:
downloading and reproducing, if a music file that includes the search word exists within the preset web server, the found music file from the preset web server.

7. The method of claim 1, wherein upon input of the hotkey for requesting to search for a music file, prompting a user to input the search word.

8. A device for searching for a music file of a mobile terminal, the device comprising:
a storage unit for storing a music file;
a controller for determining, when at least one input key signal in an idle state of the mobile terminal receives, whether a hotkey for requesting to search for a music file is input, and displaying, if the hotkey for requesting to search for a music file is not input, a phonebook data search result according to the at least one input key signal;
a conversion unit for combining, if the hotkey for requesting to search for a music file is input, characters mapped to at least one input key signal in an idle state of the mobile terminal and converting the combined characters to a search word for searching for a music file;
a search unit for searching for a music file that includes the search word in the storage unit; and
a Radio Frequency (RF) unit for transmitting a music file search request signal to a preset web server,
wherein the controller requests, if a music file that includes the search word does not exist in the storage unit, a search for a music file that includes the search word to the preset web server.

9. The device of claim 8, further comprising:
a display unit for displaying a list of music files that include the search word and that are stored in at least one of the storage unit and the preset web server.

10. The device of claim 8, wherein the controller controls to display a pop-up window for determining, if a music file including the search word does not exist in the storage unit, whether the mobile terminal is connected to the preset web server.

11. The device of claim 8, wherein the storage unit stores an address of the preset web server set and stored by one of a provider of the mobile terminal and a user of the mobile terminal.

12. The device of claim 8, wherein the search unit searches for a music file by determining whether the search word is included in attribute information including at least one of a music file name, an album name, and a singer name.

13. The device of claim 8, wherein the controller downloads and reproduces a music file from the preset web server according to a user request.

14. The device of claim 8, wherein the hotkey for requesting to search for a music file is configured such that when the hotkey is input, a user is prompted to input the search word.

15. A non-transitory computer readable medium having embodied thereon instructions for providing a method of searching for a music file of a mobile terminal, the method comprising:
receiving at least one input key signal in an idle state of the mobile terminal;
determining whether a hotkey for requesting to search for a music file is input;
displaying, if the hotkey for requesting to search for a music file is not input, a phonebook data search result according to the at least one input key signal;
setting, if the hotkey for requesting to search for a music file is input, a search word by combining characters mapped to the received at least one input key signal;
determining whether a music file that includes the search word exists within the mobile terminal; and
requesting, if it is determined that a music file that includes the search word does not exist within the mobile terminal, a search for a music file that includes the search word to a preset web server.

* * * * *